United States Patent [19]
Abernathy et al.

[11] 3,813,183

[45] May 28, 1974

[54] INSERT FACING TOOL

[75] Inventors: William J. Abernathy; Lowell G. Snoddy, both of Huntsville, Ala.

[73] Assignee: The United States of America as represented by the Administrator of the National Aeronautics and Space Administration, Washington, D.C.

[22] Filed: Aug. 2, 1972

[21] Appl. No.: 277,436

[52] U.S. Cl.................. 408/80, 408/111, 90/12.5
[51] Int. Cl.......................... B23b 41/00, B23b 1/20
[58] Field of Search .......... 408/80, 79, 72, 99, 110, 408/111, 241 R, 100, 101; 90/12.5

[56] References Cited
UNITED STATES PATENTS 1,841,938  1/1932  Davis............................... 90/12.5 X
2,385,589  9/1945  Shepler.............................. 90/12.5

*Primary Examiner*—Gil Weidenfeld
*Attorney, Agent, or Firm*—L. D. Wofford, Jr.; W. H. Riggins; John R. Manning

[57] ABSTRACT

A manually actuated tool for facing the exposed end of an insert installed in a honeycomb panel so that the open end of the insert will be flush with or slightly undercut from the outer surface of the panel comprising a rotatable axial stud having a threaded end adapted to screw into an internally threaded sleeve of the insert. A plurality of cutting bits are held in a round body portion that is manually rotated around the stud so that the cutting bits continuously engage the end of the insert in a cutting action. Pressure is adjustably applied through a spring against the body portion, and thus the bits, by a pressure nut threaded on the stud.

6 Claims, 3 Drawing Figures

PATENTED MAY 28 1974 3,813,183

3,813,183

INSERT FACING TOOL

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

This invention relates generally to facing tools and more particularly to a manually actuated facing tool for facing inserts installed in panels or the like.

Round inserts containing internally threaded sleeves are often installed in supporting structures, such as honeycomb panels, to provide a means for fastening various items to the panels with screws. As is well known, honeycomb structures are extensively used in the manufacture of space vehicles and associated hardware and critical apparatus housed in compact containers, often called "black boxes", are screw mounted on the honeycomb structures. Since these "black boxes" usually include electrical devices, electrical contact between the boxes and the outer surface of the honeycomb structures is used as a ground connection.

The process of installing an insert in a honeycomb panel usually involves drilling an oversize hole in the panel and securing the insert in the hole with epoxy resin. While the open or accessible end of the insert is left generally flush with the mounting surface of a honeycomb panel, it is often not sufficiently flush to assure good electrical contact between the box being mounted and the mounting surface of the honeycomb panel. Also if the exposed end edge of the insert is not near perfectly parallel with the mounting surface of the honeycomb panel undesirable stresses are introduced into the box upon mounting. This condition may result from slightly tilting the insert during installation.

To avoid the possibility of stressing the boxes being mounted and of having inadequate electrical contact between the boxes and the mounting surface of the honeycomb panels, the exposed ends of the inserts are faced so as to make the ends flush with the panel mounting surface or slightly undercut therefrom. Prior tools, e.g., pneumatic cutting tools, utilized for facing the inserts having proven unsatisfactory because of lack of a means for locating or holding the cutting edges parallel with the mounting surface of the honeycomb panel and for applying a measured and constant load on the tool cutters during the facing process.

SUMMARY OF THE INVENTION

The invention comprises a body portion holding a plurality of cutting elements arranged to contact and cut the exposed end of an insert installed in a supporting panel during the insert facing operation. The body portion has a relatively large planar bearing surface for bearing on the planar mounting surface of a supporting panel to establish and maintain a parallel relationship between the body and the mounting surface. An elongated stud extends axially through the body portion with the stud and body portion being rotatable relative to each other. The stud has a threaded end portion adapted for being screwed into an internally threaded sleeve contained within the insert to thereby fix the facing tool in the proper position relative to the insert and supporting panel. Pressure is adjustably applied to the body portion by a pressure nut carried by the stud with a spring arranged between the pressure nut and the body portion.

Accordingly, it is a general object of the present invention to provide an improved facing tool.

A more specific object of the invention is to provide a manually actuated tool for facing the exposed ends of inserts installed in supporting structures so that the exposed ends will be flush with or slightly undercut from the mounting surface of the supporting structure.

Another object of the invention is to provide a tool for facing the exposed ends of inserts installed in honeycomb panels whereby "black boxes" may be screw mounted on the honeycomb panels with proper electrical contact being established between abutting surfaces of the "balck boxes" and the mounting surface of the honeycomb panel and whereby undesirable stresses will not be introduced into the "black boxes."

Another object of the invention is to provide a simple and economical manually actuated facing tool having means for establishing and maintaining a parallel relationship between the surface being faced and the surrounding surface and for applying a constant pressure urging the cutting edges of the tool against the surface being faced. These and other objects and advantages of the invention will become apparent upon reference to the following specification, attendant claims and drawing.

DESCRIPTION OF THE PREFERRED EMBODIMENT

Figure 2:
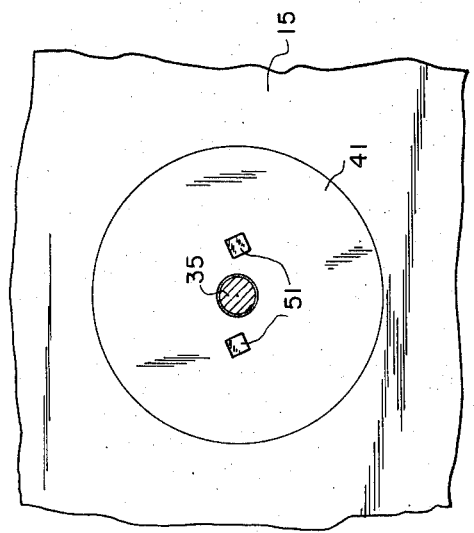
FIG. 2 is a sectional view taken along line 2—2 of FIG. 1.
Figure 3:
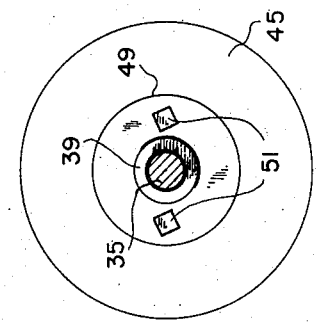
FIG. 3 is a sectional view taken along line 3—3 of FIG. 1.
Figure 1:
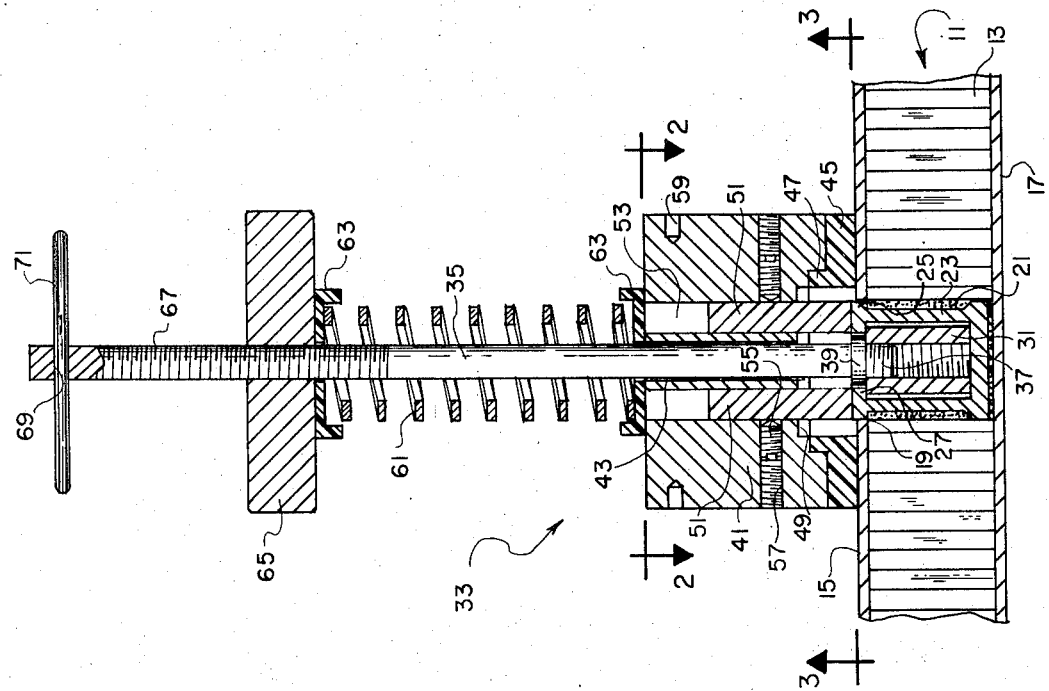
FIG. 1 is a sectional view showing an insert facing tool embodying the present invention with the tool being attached to an insert of a honeycomb structure.

Referring to FIG. 1 therein is shown a honeycomb panel 11 comprising a honeycomb core 13 and opposed facing sheets 15 and 17 bonded to the core 13. Anchored within an opening 19 in one side of the honeycomb panel 11, as by epoxy resin 21, is a cylindrical insert 23. As is apparent, the lower end of the insert 23 is bonded to the interior surface of the lower sheet 17 and the upper end of the insert is approximately flush with the exterior surface of the upper facing sheet 15. As a practical matter, the upper end of the insert 23 may project slightly above the exterior surface of the sheet 15, as indicated somewhat exaggeratedly in FIG. 1. The upper end of the insert 23 comprises a flange 25 a portion 27 of which projects slightly inwardly of the insert so as to capture within the insert an internally threaded sleeve 31.

The purpose of the insert 23 is to facilitate the mounting of various compact units, often called "black boxes," on the honeycomb panel 11. As is apparent, the inserts 23 appropriately located in the panel provides a means for mounting the "black boxes" with screws received by the threaded sleeves 31. As previously indicated herein, when the inserts 23 are installed in the honeycomb panel 11 the top surface of the flange 25 is usually not sufficiently flush with the outer surface of the sheet 15. This is often caused by the insert being slightly tilted from the perpendicular during installation so that the flange surface is not exactly parallel with the sheet 15. It is not good practice to attach units containing delicate and critical equipment to the inserts when a portion of the insert is projecting slightly above the top surface of the honeycomb panel. To do so produces stress in the portions of the units bearing on the uneven surface. Moreover, when the boxes to be mounted contain electrical circuitry it is essential that good electrical contact be established between the facing sheet of the honeycomb panel and the portion of the box bearing on the sheet since this contact is often used as a ground connection.

The insert facing tool of the present invention is used to modify the top annular surface of the insert 23, i.e., flange 25, so that the surface is flush with the upper surface of the facing sheet 15 or slightly undercut below the facing sheet surface. The facing tool, indicated generally at 33, comprises a vertical stud 35 located axially of the tool 33. The stud 35 has a lower end portion 37 that is externally threaded to be threaded into the sleeve 31 of the insert 23. An annular stop 39 marks the upper end of the threaded portion 37. A circular metallic body 41 has a central hole 43 therethrough that is occupied by the stud 35 with the stud and the body being rotatable relative to each other. For reasons to be set forth hereinafter the body 41 has a circular element 45 bonded to the lower end thereof which is made of a material such as Teflon that provides a smooth bearing surface for bearing on the surface sheet 15. The element 45 has a slight vertical projection 47 that fits in a recess 49 in the lower end of the body.

A pair of cutting bits 51 are adjustably fixed in the body 41, being received in openings 53, and secured by setscrews 55 positioned in threaded holes 57 arranged perpendicularly to the bits 51. A plurality of blind holes 59 are formed in the surface of the body 41 to receive removable handles (not shown) for manually rotating the body 41 during a cutting operation to be described subsequently.

Overlying the body 41 is a helical spring 61 concentrically encompassing the stud 35 and bearing at each end on Teflon spring guides 63. The lower spring guide 63 contacts the body 41 and the upper spring guide 63 contacts a pressure nut 65 that is threadedly movable over an upper threaded portion 67 of the stud 35. A hole 69 is provided near the upper end of the stud 35 to receive a removable handle 71 for manually rotating the stud 35.

OPERATION

When using the insert facing tool 33 for facing the upper end of the insert 23 the tool is first firmly fixed to the insert by screwing the lower end portion 37 of the stud 35 into the sleeve 31 of the insert until the stop 39 of the stud bears on the upper end of the sleeve 31. The stud is easily rotated manually through the removable handle 71. Thereafter the pressure nut 65 is rotated until the proper pressure is exerted on the cutter holding body 41 through the spring 61. The cutting ends of the bits 51 are sized and positioned to correspond to the end of the insert 23. Adjustments in the longitudinal position of the bits 51 are conveniently made through the set-screws 55 for the desired cutting of the insert 23.

The cutting action of the bits 51 on the end of the insert 23 is effected by manually rotating the body 41 clockwise. A handle (not shown) may be removably inserted in the blind holed 59 to facilitate rotation of the body 41. As the body 41 rotates, the bits 51 continuously engage the end of the insert 23 in a cutting action until the relatively large and smooth surface of the bearing element 45 continuously contacting the outer surface of the sheet 15 results in the cutting plane of the bits 51 becoming parallel with the outer surface of the sheet 15. When this continuous or full contact between the bearing element 45 and the outer surface of the sheet 15 has been achieved the cutting action will be complete and a parallel relationship will exist between the faced surface of the insert 23 and the surrounding surface of the facing sheet 15.

We claim:

1. A facing tool comprising:
   a body portion holding a cutting element having a cutting surface adapted to contact a surface to be faced by said tool;
   said body portion comprising a smooth bearing surface encompassing said cutting element;
   means for attaching said body portion adjacent a surface to be faced by said tool whereby said body portion may be rotated while so attached;
   said attaching means comprising a stud extending through said body portion;
   means including said stud for applying pressure against said body portion and urging said body portion and thus said cutting element toward a surface to be faced by said tool;
   said pressure applying means further including means carried by said stud for varying the pressure applied against said body portion.

2. The invention as defined in claim 1 wherein said stud extends axially through said body portion, said stud and said body portion being rotatable relative to each other.

3. The invention as defined in claim 2 including a plurality of said cutting elements, said cutting elements comprising cutting bits positioned in corresponding openings in said body portion, means for clamping said bits in said openings.

4. The invention as defined in claim 1 wherein said pressure applying means carried by said stud includes a pressure nut threadedly engaging said stud, a spring disposed between said body portion and said pressure nut.

5. The invention as defined in claim 1 wherein said means for attaching said body portion adjacent a surface to be faced further comprises a threaded end portion of said stud, said end portion being adapted for screwing into a threaded part of an insert installed in a supporting structure.

6. The invention as defined in claim 1 wherein said bearing surface comprises Teflon.

* * * * *